United States Patent [19] [11] 4,282,283
George et al. [45] Aug. 4, 1981

[54] LAMINATED FIBERGLASS FABRIC

[75] Inventors: Stephen George; Thomas H. George, both of Bronx, N.Y.

[73] Assignee: Textured Products, Inc., Hartsdale, N.Y.

[21] Appl. No.: 88,835

[22] Filed: Oct. 29, 1979

[51] Int. Cl.³ .................... B32B 17/06; B32B 7/04; B32B 7/12
[52] U.S. Cl. .................... 428/228; 428/251; 428/285; 428/292
[58] Field of Search ............... 428/227, 228, 233, 234, 428/235, 236, 246, 251, 253, 254, 268, 273, 280, 282, 285, 300, 292–295

[56] References Cited

U.S. PATENT DOCUMENTS

| 2,970,365 | 2/1961 | Morgenstern | 428/235 |
| 3,127,135 | 3/1964 | Burr et al. | 428/282 |
| 3,393,117 | 7/1968 | Zolg et al. | 428/236 |
| 3,493,461 | 2/1970 | Sterman et al. | 428/251 |
| 3,616,185 | 10/1971 | Goldberg | 428/251 |
| 3,924,040 | 12/1975 | Addie et al. | 428/300 |
| 3,934,064 | 1/1976 | Lowthian | 428/228 |
| 4,070,519 | 1/1978 | Lefkowitz | 428/253 |
| 4,135,029 | 1/1979 | Pfeffer | 428/285 |
| 4,139,591 | 2/1979 | Jurisich | 428/251 |
| 4,146,663 | 3/1979 | Ikeda et al. | 428/246 |

Primary Examiner—William J. Van Balen
Attorney, Agent, or Firm—Scully, Scott, Murphy & Presser

[57] ABSTRACT

A laminated fiberglass fabric composition is prepared by laminating a non-woven fabric to a knitted or woven fiberglass fabric with a plastisol laminating adhesive. Heat compressing the assembled materials envelops the individual fiberglass yarns with the non-woven fabric producing a fabric composition which is highly resistant to damage caused by severe twisting or flexing forces applied to the fabric. The use of a flame resistant laminating adhesive imparts flame resistant to these fabric compositions.

29 Claims, 2 Drawing Figures

LAMINATED FIBERGLASS FABRIC

BACKGROUND OF THE INVENTION

This invention relates to fiberglass fabrics. More particularly, it relates to a fiberglass fabric laminated so as to prevent or to at least substantially eliminate abrading of the individual fiberglass yarns against each other. This invention especially relates to fiberglass fabrics laminated with flame resistant materials so as to prevent or at least substantially eliminate abrading of the fiberglass fabric.

During the production of fiberglass filaments, a protective coating or sizing is applied to the individual filaments to reduce the tendency of the filaments to abrade when brought into close contact. A protective coating is also required during later processing when the fiberglass filaments are woven or knitted into fabric. However, this coating provides only a small measure of protection in the variety of end uses in which the fiberglass fabrics are employed. Thus, when these woven or knitted fabrics are subjected to repeated twisting or flexing, the fiberglass yarns forming the fabric abrade and cut against each other often causing the fabric to fail.

Fabrics find a variety of uses in industry. Sensitive industrial equipment, such as computers, often require dust-proof wrappers and coverings during transit, storage and periods of prolonged down time to protect the equipment from damage which would necessitate costly repair. Fire resistant fabrics find use as fire wall blankets or in protective screening used during such processes as welding. Industrial clothing, such as uniforms, coveralls, jackets, coats and other protective coverings, are prepared from a variety of fabrics to provide protection to industrial workers from chemicals, fire and other industrial hazards. Although fiberglass fabric possesses properties such as high tensile strength, inertness and flame resistance which makes it a candidate for some or perhaps all of the above industrial uses, the individual fiberglass fibers tend to abrade against each other when subjected to flexing and twisting which can cause failure of the fiberglass fabric. This property detracts somewhat from its use as an industrial fabric.

It is an object of this invention to provide a fiberglass fabric which will be highly resistant to damage from severe twisting or flexing of the fabric.

It is another object of this invention to provide a flame resistant fabric which will provide protection from high temperatures, molten metals, and open flames.

It is a further object of this invention to provide an industrial fabric which will provide long wear life when subjected to severe working conditions which often cause ripping and tearing of industrial clothing.

SUMMARY OF THE INVENTION

In accordance with the present invention it has been found that a superior industrial fabric can be prepared by laminating a porous fiberglass fabric with a platisol laminating adhesive and a non-woven fabric whereby the yarns in the fiberglass fabric are enveloped with non-woven fabric.

More particularly, this invention is directed to a laminated fiberglass fabric composition comprising:
(a) a porous fabric, comprising fiberglass,
(b) a plastisol laminating adhesive formed on the upper and lower surfaces of said fiberglass fabric, and
(c) a non-woven fabric laminated to one of the upper surfaces of said fiberglass fabric by said adhesive, said non-woven fabric having been compressed into said fiberglass fabric so as to envelope the yarn of the fiberglass fabric with non-woven fabric.

This invention is also directed to a method of preparing this laminated fiberglass fabric which comprises:
(a) forming a layer of a plastisol laminating adhesive on one surface of a fiberglass fabric, and
(b) laminating the other surface of the fiberglass fabric with a plastisol laminating adhesive and a non-woven fabric whereby the yarns of fiberglass fabric are enveloped with non-woven fabric Further, this invention is directed to a flame resistant laminated fiberglass fabric composition comprising:
(a) a porous fabric comprising fiberglass
(b) a flame resistant plastisol laminating adhesive formed on the upper and lower surfaces of said fiberglass fabric, and
(c) a flame resistant non-woven fabric laminated to one of the surfaces of said fiberglass fabric by said adhesive, said non-woven fabric having been compressed into said fiberglass fabric so as to envelop the yarn of the fiberglass fabric with non-woven fabric.

This invention is also directed to a method of preparing this flame resistant fiberglass fabric which comprises:
(a) forming a layer of a flame resistant plastisol laminating adhesive on one surface of a fiberglass fabric, and
(b) laminating the other surface of the fiberglass fabric with a flame resistant plastisol laminating adhesive and a flame resistant non-woven fabric whereby the yarns of the fiberglass fabric are enveloped with non-woven fabric.

In addition, the invention is directed to a flame resistant laminated fiberglass fabric composition
(a) a porous fabric comprising fiberglass
(b) a flame resistant plastisol laminating adhesive formed on the upper and lower surfaces of said fiberglass fabric.
(c) a non-flame resistant, non-woven fabric laminated to one of the surfaces of said fiberglass fabric by said adhesive, and
(d) a flame resistant plastisol laminating adhesive formed on outer surface of said non-woven fabric, said non-woven fabric having been compressed into said fiberglass fabric so as to envelop the yarn of the fiberglass fabric with non-woven fabric.

This invention is also directed to a method of preparing this flame resistant fiberglass fabric which comprises:
(a) forming a layer of a flame resistant plastisol laminating adhesive on one surface of a fiberglass fabric, and
(b) laminating the other surface of the fiberglass fabric with a flame resistant plastisol laminating adhesive and a non-flame resistant non-woven fabric whereby the yarns of the fiberglass fabric are enveloped with non-woven fabric and a portion of said flame resistant plastisol laminating adhesive forms a layer on the outer surface of said non-flame resistant, non-woven fabric.

This invention is further directed to a laminated fiberglass fabric composition comprising:
(a) a porous fabric comprising fiberglass,
(b) a plastisol laminating adhesive formed on one of the surfaces of said fiberglass fabric, and (c) a non-woven fabric laminated to said surface of said fiberglass fabric by said adhesive, said non-woven fabric having been compressed into said fiberglass fabric so as to envelope the yarn of the fiberglass fabric with non-woven fabric.

This invention is also directed to a method of preparing this laminated fiberglass fabric which comprises:

(a) laminating a surface of the fiberglass fabric with a plastisol laminating adhesive and a non-woven fabric whereby the yarns of fiberglass fabric are enveloped with non-woven fabric.

BRIEF DESCRIPTION OF THE DRAWINGS

The present invention will be more readily understood by reference to the accompanying drawings.

DESCRIPTION OF THE PREFERRED EMBODIMENTS

Figure 1:
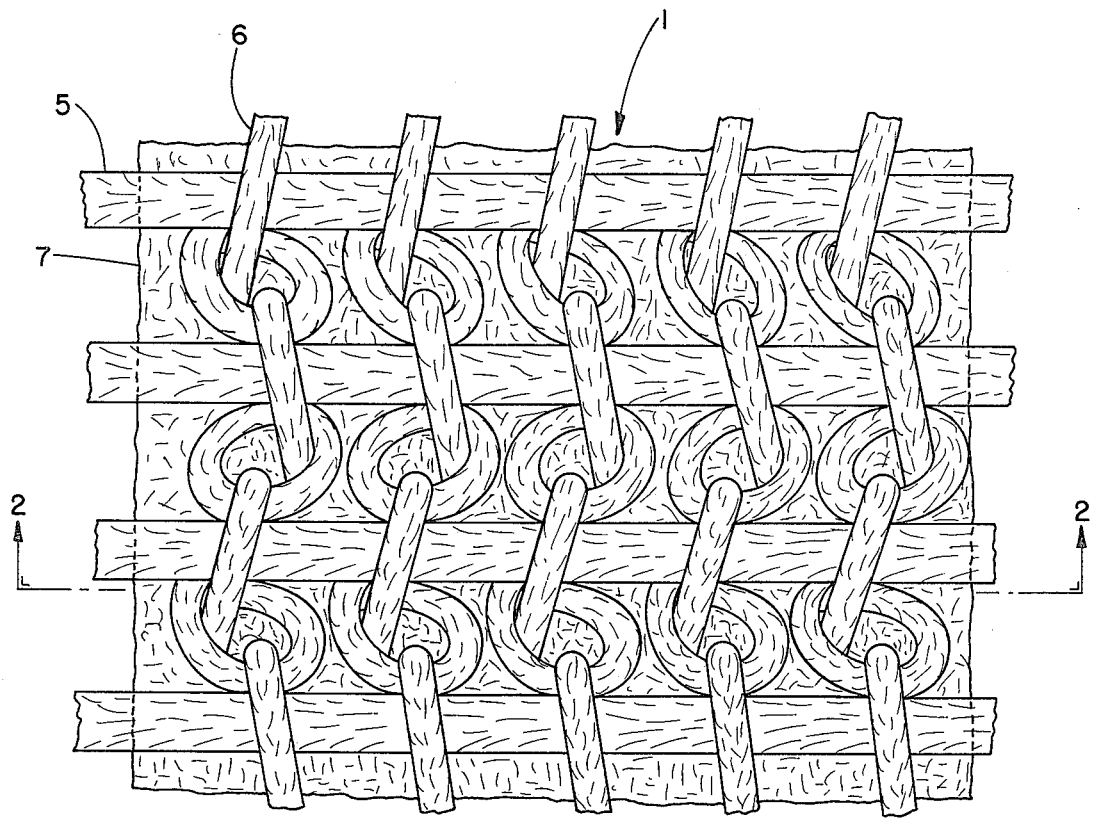
FIG. 1 is an enlarged plan view of a segment of the laminated knit fiberglass fabric prepared in accordance with the present invention.

This invention relates to laminated fiberglass fabrics particularly useful for industrial purposes. This fabric construction comprises a woven or knitted fiberglass fabric bonded to a non-woven fabric so as to form a composite fiberglass fabric that is highly resistant to damage caused by twisting or flexing forces.

The laminated fabric composition of this invention may be provided with flame resistant properties by employing a flame resistant plastisol laminating adhesive and, optionally, a flame resistant non-woven fabric. Where flame resistance is neither desired nor required, laminating adhesives which do not exhibit this property and non-flame resistant non-woven fabrics may be employed. Regardless of whether flame resistance is an end-use requirement or not, the present invention provides laminated fiberglass fabrics in either embodiment which are highly resistant to damage caused by severe twisting and flexing of the fabric, especially those encountered during the normal use of industrial fabrics.

The fabric composition of the present invention consists of a porous fiberglass fabric of woven or knitted construction coated on one side with a plastisol laminating adhesive. On the other side a layer of the plastisol adhesive bonds a non-woven fabric to the base fabric of fiberglass. Where flame resistance is desired and the non-woven fabric is flame resistant, no further coating is required. However, where the non-woven fabric does not possess the desired flame resistant properties, a further coating of the plastisol laminating adhesive may be applied over the non-woven fabric. After each layer of adhesive is applied it is subjected to slightly elevated temperatures sufficient to fuse and bond the adhesive to the underlying and/or the overlying fabric. Following the application of the flame resistant, non-woven fabric or the layer of plastisol laminating adhesive to the non-flame resistant, non-woven fabric, the entire fabric construction is subjected to a heat compression sufficient to cause the non-woven fibers to be compressed into the interstices of the fiberglass fabric whereby the non-woven fibers at least partially envelop and are bonded to the yarns of the fiberglass fabric.

The non-flame resistant version of the laminated fabric composition of this invention is prepared in a similar fashion although, of course, flame resistance of the laminating adhesive and the non-woven fabric is not a requirement. Therefore, the application of a layer of plastisol laminating adhesive to the outer surface of the non-woven fabric is not necessary, although it may be applied, if desired.

In another embodiment of the invention, the plastisol laminating adhesive is applied to only one side of the fiberglass fabric and the non-woven fabric is bonded to that surface of the fiberglass. The resultant fabric retains some of the porosity of the fiberglass fabric and thus is "breathable", a property which those fabrics of the present invention which are coated on both sides do not possess. The "breathable" embodiment of these laminated fabrics finds utility as an upholstery covering, particularly as a seating surface on a upholstered piece.

Those skilled in the art can appreciate that these breathable fabrics may be prepared in a fashion similar to that described hereinbefore for fabrics coated on both sides by making suitable adjustments in the procedure to obtain the desired results. Accordingly, after one side of the fiberglass fabric is coated with plastisol laminating adhesive and it is heated to effect the required degree of fusing and bonding, the non-woven fabric is applied to the adhesive surface and the entire fabric construction is subjected to the necessary degree of heat compression to produce the finished laminated fabric. Optionally a further layer of laminating adhesive may be applied to the outer surface of the non-woven fabric before the heat compression where this is found desirable. This breathable laminated fabric may be prepared in either a flame resistant or a non-woven resistant version as explained herein for the other laminated fabrics of this invention.

The completed fabric construction may be pictured as having the fiberglass fabric embedded in the compressed non-woven fabric. The heat compressed non-woven fibers envelop the yarns of the fiberglass fabric and protect them from abrasion and fracture, maintain the separation of the fiberglass yarns within the fiberglass structure by filling the interstices of the fabric with compressed non-woven fabrics and form a tough backing material that prevents the composite fabric from forming a sharp crease when it is folded. It is the forming of sharp creases in the fiberglass fabric which has heretofore resulted in the fiberglass yarns folding over themselves causing cutting and abrading of each other at the folding point until the fabric fails. The present invention substantially eliminates abrading of fiberglass fabrics caused by sharp creases forming in the fiberglass fabric itself.

The fabric composition of the present invention has the following mechanical characteristics: high tensile strength, high flexural strength, high tear strength, high burst strength, high abrasion resistance and high puncture resistance.

The porous fiberglass fabrics employed in the subject invention include fiberglass fabrics available commercially. The fabric may be either woven or knitted but a knitted fabric is preferred. Although the porous fiberglass fabric is preferably formed of all fiber glass yarns, it may be constructed with other yarns, such as those composed of rayon, nylon or modified acrylic fibers, combined with fiberglass yarns or with only the weft layin yarn of a knitted fabric or the warp of the woven fabric comprised of fiberglass. When these other yarns are incorporated into the knitted fiberglass fabrics usefully employed in this invention, it is preferred that they comprise at least 50 wt.% of the knit yarn and that fiberglass comprise at least 60 wt.% of the total weight of these preferred knitted fabrics.

The fabric which is bonded to and compressed so as to envelop the fiberglass yarns is a non-woven fabric, preferably needle-punched. The non-woven fabric is preferably composed of aramid, polyester, nylon or acrylic fibers. A non-woven fabric of aramid is particularly preferred in preparing the flame resistant embodiment of the fabrics of this invention since it is inherently flame resistant and non-melting. No additional hazard of ignition is introduced into the composite fabric when non-woven fabrics of aramid are employed in this invention. Fabrics made from aramid fibers have been employed heretofore industrially in protective clothing, coveralls, and fire fighting clothing because of this fiber's built-in flame resistance. Non-woven fabrics of the other preferred materials (polyester, nylon or acrylic fibers) may be used in preparing either the flame resistant or the non-flame resistant versions of the instant fabrics. Since non-woven fabrics of these materials are not inherently flame resistant, an additional coating of flame resistant plastisol laminating adhesive must be applied to the outer surface of these non-woven fabrics when they are employed to prepare the flame resistant fabrics of the present invention. Despite this, these non-woven fibers impart excellent protection to the yarns in the fiberglass fabric when employed to prepare a flame resistant fabric composition. Of course, no plastisol outer coating is necessary when these non-woven fabrics are employed with a non-flame resistant plastisol laminating adhesive to prepare the non-flame resistant embodiment of these laminated fabrics.

The plastisol laminating adhesive used in bonding the two fabrics together can also provide a flame resistant coating over the fiberglass and the non-woven fabrics. Thus, depending on end-use requirements the plastisol laminating adhesive employed may be either flame resistant or non-flame resistant. Either adhesive provides a soft rubbery polymeric coating. The flame resistant version of the adhesive comprises a number of components in order to provide the desired properties to the composite fabric. Thus, the preferred formulation contains polymeric resins, plasticizers, stabilizers, modifiers, fire retardant materials and, optionally, pigments so as to provide the final fabric with flame resistance, flexural and burst strength and tear and abrasion resistance. Polyvinyl chloride resins find particularly utility in formulating this adhesive. Phosphate-type and other heat stabilizing plasticizers are incorporated with the PVC resin as well as such stabilizers as calcium-zinc complexes, epoxy resins and melamine. In addition, antimony oxide, preferably in slurry form, is combined with the polyvinyl chloride resin to impart additional flame retardant properties to the laminating adhesive. When admixed and applied with an effective amount of heat and pressure, this complex mixture imparts a tough, flexible, flame-retardant coating to the laminated fabric.

For the non-flame resistant fabrics of this invention, commercially available laminating adhesives may be employed. Particularly useful as the non-flame resistant plastisol laminating adhesive are the urethane and acrylic polymer laminating adhesives.

Thin layers of the plastisol are usually satisfactory for preparing these laminated fabrics but, of course, thicker layers can be used where necessary. The layer must be sufficiently thick to effectively bond the fabrics together. Typically, layers of about 3 to 10 mils, usually about 5 to 7 mils of the plastisol are found to be satisfactory. After the layer of plastisol laminating adhesive is applied to a fabric, the coated fabric is heated at elevated temperatures which are effective for fusing and bonding the adhesive to the fabric. Subjecting the coated fabrics to temperatures in the range of 275°–325° F. for 5 minutes or less will normally provide a satisfactory degree of bonding and fusing. One skilled in the art can appreciate that the time and temperature to be used will be dependent upon the particular materials being employed and the end-use requirements of the product.

A preferred method employed to prepare the flame resistant composite fabrics of this invention is performed in a number of steps. First the fire resistant plastisol formulation is applied to one side of the porous fiberglass substrate fabric. Where a knitted fabric is employed it is preferred that the adhesive be applied to the knit side of the fabric. After applying a thin coat of about 5 to 7 mils, to the fabric, it is placed in an oven at elevated temperature of about 300° F. for approximately 3 minutes to fuse and bond the adhesive to the fiberglass fabric. The non-woven fabric is then laminated to the other side of the fiberglass fabric (the fill side of a knitted fiberglass fabric) by applying a thin layer of the plastisol laminating adhesive to the fiberglass fabric and pressing the non-woven fabric into the adhesive. The partially assembled composite fabric is again placed in an oven at elevated temperatures for a short period of time to fuse and bond the non-woven fabric to the fiberglass fabric. Where the non-woven fabric does not inherently have flame resistant properties, a further coating of the laminating adhesive is applied over the non-woven fabric and again subjected to elevated temperatures for a few minutes to bond the adhesive to the exterior surface of the non-woven fabric. The final step in preparing the laminated fiberglass fabric is to subject the layered construction to heat compression of 5 to 15 psi at a temperature of 300°–400° F. for 15–30 seconds. During the heat compression the non-woven fabric is compressed into the interstices of the fiberglass fabric enveloping the individual yarns and bonding to the yarn. It is this final step which provides protection to the fiberglass from the abrading which can otherwise result in a failure of the fiberglass fabric. In the finished product the fiberglass fabric is essentially embedded in the compressed non-woven fabric.

Those skilled in the art will appreciate that the non-flame resistant fabrics of the invention may be prepared in a similar fashion.

Figure 2:
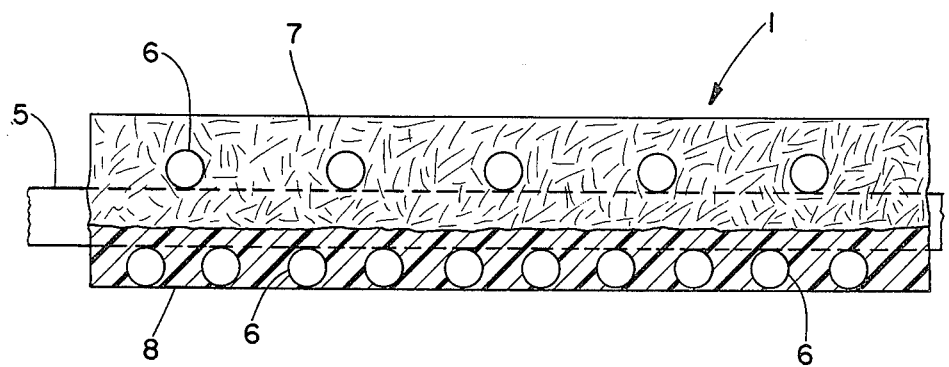
FIG. 2 is an enlarged cross-sectional view of the laminated knit fiberglass fabric prepared in accordance with the present invention.

The construction of the completed laminated fabric may be more readily understood from the following description taken with reference to FIGS. 1 and 2 wherein the use of like numerals has been employed to designate like parts.

The composite fabric 1 is constructed of a knitted fiberglass fabric composed of fill or layin fiberglass yarn 5 and knit fiberglass yarn 6. A heat compressed needle-punched non-woven fabric 7, composed of aramid, polyester nylon or acrylic fibers, is bonded to the fill side of the knitted fiberglass fabric with a plastisol laminating adhesive. A layer of the plastisol laminating adhesive forms a face coating 8 on the knit side of the fiberglass fabric.

The following examples will serve to illustrate the subject invention.

EXAMPLE 1

A fiberglass fabric laminated with an aramid nonwoven fabric was prepared using a knitted fiberglass fabric having the following description:
Fabric weight: 7.5 ounces per square yard.
Knit pattern: cable stitch, weft layin.
Knit construction: warp knit
  a. stitches per inch of fabric width: 24
  b. courses per inch of fabric length: 27
Yarn designation:
  Knit yarn: B-150 1/0 or C-150 1/0
  Layer yarn: B-150 1/0 or C-150 1/0

A B-150 1/0 yarn has the following specification: The B designates a nominal filament diameter of 0.00014 inches. The 150 1/0 indicates that there are 1224 filaments per strand and that the yarn is made up of one strand. One pound of this yarn is approximately 470 yards long. The yarn is 300 denier.

The C in the C-150 1/0 designates a filament diameter of 0.00015–0.000199 inches.

The non-woven fabric employed was prepared from aramid fibers and was a needle-punched non-woven fabric manufactured by Southern Mills, Inc. and designated as S/9 aramid plain interlining, weighing 7.5 ounces per square yard. The aramid fibers used in this non-woven construction were manufactured by E. I. DuPont de Nemours and Company and sold under the trademark Nomex.

The plastisol laminating adhesive employed had the following formulation:

| PLASTISOL LAMINATING ADHESIVE | | |
|---|---|---|
| Materials | | Parts by Weight |
| 1. Dispersion resins | | |
| (a) Geon 130 X17 | | 50 |
| Polyvinyl chloride | | |
| B.F. Goodrich Chemical Co. | | |
| Cleveland, OH | | |
| (b) Geon 128 | | 50 |
| Polyvinyl chloride | | |
| B.F. Goodrich Chemical Co. | | |
| Cleveland, OH | | |
| | Total | 100 |
| 2. Plasticizers | | |
| (a) Tricresyl Phosphate (TCP) | | 53 |
| (b) Santicizer 148 | | 32 |
| (phosphate-type plasticizer) | | |
| Monsanto Chemical Co. | | |
| St. Louis, MO | | |
| (c) Santicizer 154 | | 32 |
| (phosphate-type plasticizer) | | |
| Monsanto Chemical Co. | | |
| St. Louis, MO | | |
| (d) Texanol Isobutylrate (TXIB) | | 10 |
| Eastman Chemical Products, Inc. | | |
| Kingsport, TN | | |
| (e) Epoxol 8-2B | | 5 |
| Epoxidized butyl linseed oil | | |
| Swift Chemical Co. | | |
| Chicago, IL | | |
| | Total | 132 |
| 3. Stabilizers and Modifiers | | |
| (a) Nuostabe V-142 | | 1 |
| Calcium-zinc complex | | |
| Tenneco Chemicals Inc. | | |
| Piscataway, NJ | | |
| (b) Epon 828 | | 4 |
| Epoxy resin | | |
| Shell Chemical Co. | | |
| Houston, TX | | |
| (c) Cymel 301 | | 5 |
| Hexaneethoxymethylmelamine | | |
| American Cyanamid Co. | | |
| Wayne, NJ | | |
| (d) Pegosperse 400MO | | 1 |
| Polyethylene glycol mono-oleate | | |
| Glyco Chemicals Inc. | | |
| Greenwich, CT 06830 | | |
| | Total | 11 |
| 4. Antimony Oxide Slurry | | |
| (a) Tricresyl Phosphate (TCP) | | 7.9 |
| Stauffer Chemical | | |
| New York, NY | | |
| or | | |
| Ashland Chemical | | |
| Columbus, OH | | |
| (b) Pegosperse 400MO | | 0.2 |
| Polyethylene glycol mono-oleate | | |
| Glyco Chemicals Inc. | | |
| Greenwich, CT | | |
| (c) T-Top-12 | | 0.1 |
| Titanate coupling agent | | |
| Kenrich Petrochemicals, Inc. | | |
| Bayonne, NJ | | |
| (d) Antimony oxide | | 10.0 |
| | Total | 18.2 |
| Pigment | | |
| (a) Inmont 267 Yellow | | 15.7 |
| (b) Inmont 239 Red | | 0.325 |
| | Total | 16.025 |
| | Total | 277.225 |

The laminated fiberglass fabric composition was prepared as follows:

A 7 mil coating of the plastisol laminating adhesive was applied to the knit side of the knitted fiberglass substrate. The coated fiberglass fabric was then placed in an oven for 3 minutes at about 300° F. during which time the plastisol coating fused and bonded to the fiberglass substrate. The non-woven needle punched aramid fabric, weighing 7.5 ounces per square yard, was laminated to the fill side of the knitted fiberglass substrate fabric by applying a 7 mil coating of the plastisol adhesive coating to the fill side of the fiberglass and applying the non-woven aramid fabric over the adhesive. The composite fabric was again heated in an oven at 300° F. for 3 minutes to fuse and bond the non-woven fabric to the fill side of the fiberglass. The fabrication process was completed by heat compressing the assembled composition at a pressure of 5 psi and a temperature of about 350° F. for a period of 20 seconds. The heat compression process compressed the non-woven aramid fibers into the interstices of the fiberglass fabric where they partially enveloped and were bonded to the fiberglass yarns comprising the porous fiberglass fabric.

EXAMPLE 2

In a fashion similar to that employed in Example 1, a laminated fiberglass fabric was prepared utilizing the fiberglass fabric and the plastisol laminating adhesive of Example 1. The non-woven fabric employed was a needle-punched, non-woven polyester fabric manufactured by J. P. Stevens and Company, Inc. and designated as style NN 121. This non-woven fabric was composed of 100% polyester fiber and weighed 2.1 ounces per square yard.

A laminated fiberglass fabric composition was prepared as follows:

A coating of the plastisol laminating adhesive was applied to the knit side of the knitted fiberglass fabric and the non-woven polyester fabric was applied to the fill side of the knitted fiberglass fabric with the plastisol laminating adhesive in a fashion similar to that of Example 1. Following the fusing and bonding of the non-woven fabric to the fiberglass, a final 7 mil layer of plastisol laminating adhesive was applied as a top coating of the non-woven face of the composite laminate fabric and heated to a temperature of 300° F. for a period of about 3 minutes. The plastisol laminating adhesive fused and bonded to form a flame resistant coating on the surface of the non-woven polyester fabric. The fabrication of the laminated fiberglass fabric composition was completed by heat compressing the composition at a pressure of about 10 pounds per square inch and a temperature of about 350° F. for a period of 20 seconds. The heat compression process compressed the non-woven polyester fibers into the interstices of the fiberglass fabric where they partially enveloped and were bonded to the individual fiberglass yarns.

Both of the laminated fabrics of Examples 1 and 2 have excellent flame resistant and will not burn or ignite during the Vertical Flame Test, designated NFPA 701, in which a lighted match is held at the lower edge of a vertically suspended section of the fabric for three seconds. In addition, the polyester-containing fabric of Example 2 provides protection from flying sparks and is therefore usefully employed in welding screens and industrial worker's clothing. The aramid-containing fabric of Example 1 may similarly be employed in the same services as the Example 2 fabrics and in addition may be subjected to more severe conditions. The Example 1 fabric will pass an aluminum molten metal test in which molten aluminum is poured down a section of the fabric suspended in air at 10° to the horizontal. The underside of these aramid-containing fabrics will not exceed about 100° F. during this severe test.

What is claimed is:

1. A laminated fiberglass fabric composition comprising:
   (a) a porous fabric comprising fiberglass yarn,
   (b) a plastisol laminating adhesive formed on the upper and lower surfaces of said fiberglass fabric, and
   (c) a non-woven fabric laminated to one of the surfaces of said fiberglass fabric by said adhesive, said non-woven fabric having been compressed into said fiberglass fabric so as to envelop the yarn of the fiberglass fabric with non-woven fabric.

2. A laminated fiberglass fabric composition according to claim 1 wherein the fiberglass fabric is knitted.

3. A laminated fiberglass fabric composition according to claim 2 wherein the knit yarn of said knitted fabric comprises at least 50 wt.% of rayon, nylon, polyester or modified acrylic fiber and fiberglass comprises at least 60 wt.% of the total knitted fabric.

4. A laminated fiberglass fabric composition according to claim 2 wherein the non-woven fabric is laminated to the fill side of the knitted fiberglass fabric.

5. A laminated fiberglass fabric composition according to claim 1 wherein the fiberglass fabric is woven.

6. A laminated fiberglass fabric composition according to claim 1 wherein the non-woven fabric comprises polyester, rayon, nylon or acrylic fiber.

7. A laminated fiberglass fabric composition according to claim 1 wherein the plastisol laminating adhesive comprises urethane or acrylic polymer.

8. A flame resistant laminated fiberglass fabric composition comprising:
   (a) a porous fabric comprising fiberglass yarn,
   (b) a flame resistant plastisol laminating adhesive formed on the upper and lower surfaces of said fiberglass fabric, and,
   (c) a flame resistant non-woven fabric laminated to one of the surfaces of said fiberglass fabric by said adhesive, said non-woven fabric having been compressed into said fiberglass fabric so as to envelop the yarn of the fiberglass fabric with non-woven fabric.

9. A laminated fiberglass fabric composition according to claim 8 wherein the fiberglass fabric is knitted.

10. A laminated fiberglass fabric composition according to claim 9 wherein the knit yarn of said knitted fabric comprises at least 50 wt.% of rayon, nylon, polyester or modified acrylic fiber and fiberglass comprises at least 60 wt.% of the total knitted fabric.

11. A laminated fiberglass fabric composition according to claim 9 wherein the non-woven fabric is laminated to the fill side of the knitted fiberglass fabric.

12. A laminated fiberglass fabric composition according to claim 8 wherein the fiberglass fabric is woven.

13. A laminated fiberglass fabric composition according to claim 8 wherein the non-woven fabric comprises aramid fiber.

14. A laminated fiberglass fabric composition according to claim 8 wherein the plastisol laminating adhesive comprises polyvinyl chloride and antimony oxide.

15. A flame resistant laminated fiberglass fabric composition comprising:
   (a) a porous fabric comprising fiberglass yarn,
   (b) a flame resistant plastisol laminating adhesive formed on the upper and lower surfaces of said fiberglass fabric,
   (c) a non-flame resistant, non-woven fabric laminated to one of the surfaces of said fiberglass fabric by said adhesive, and
   (d) a flame resistant plastisol laminating adhesive formed on outer surface of said non-woven fabric, said non-woven fabric having been compressed into said fiberglass fabric so as to envelop the yarn of fiberglass fabric with non-woven fabric.

16. A laminated fiberglass fabric composition according to claim 15 wherein the fiberglass fabric is knitted.

17. A laminated fiberglass fabric composition according to claim 16 wherein the knit yarn of said knitted fabric comprises at least 50 wt.% of rayon, nylon, polyester or modified acrylic fiber and fiberglass comprises at least 60 wt.% of the total knitted fabric.

18. A laminated fiberglass fabric composition according to claim 16 wherein the non-woven fabric is laminated to the fill side of the knitted fiberglass fabric.

19. A laminated fiberglass fabric composition according to claim 15 wherein the fiberglass fabric is woven.

20. A laminated fiberglass fabric composition according to claim 15 wherein the non-flame resistant, non-woven fabric comprises polyester, rayon, nylon or acrylic fiber.

21. A laminated fiberglass fabric composition according to claim 15 wherein the plastisol laminating adhesive comprises polyvinyl chloride and antimony oxide.

22. A laminated fiberglass fabric composition comprising:
   (a) a porous fabric comprising fiberglass yarn,
   (b) a plastisol laminating adhesive formed on one of the surfaces of said fiberglass fabric, and
   (c) a non-woven fabric laminated to said surface of said fiberglass fabric by said adhesive, said non-woven fabric having been compressed into said fiberglass fabric so as to envelop the yarn of the fiberglass fabric with non-woven fabric.

23. A laminated fiberglass fabric composition according to claim 22 wherein the fiberglass fabric is knitted.

24. A laminated fiberglass fabric composition according to claim 23 wherein the knit yarn of said knitted fabric comprises at least 50 wt.% of rayon, nylon, polyester or modified acrylic fiber and fiberglass comprises at least 60 wt.% of the total knitted fabric.

25. A laminated fiberglass fabric composition according to claim 23 wherein the non-woven fabric is laminated to the fill side of the knitted fiberglass fabric.

26. A laminated fiberglass fabric composition according to claim 22 wherein the fiberglass fabric is woven.

27. A laminated fiberglass fabric composition according to claim 22 wherein the non-woven fabric comprises aramid, polyester, rayon, nylon or acrylic fiber rayon.

28. A laminated fiberglass fabric composition according to claim 22 wherein the plastisol laminating adhesive comprises urethane or acrylic polymer.

29. A laminated fiberglass fabric composition according to claim 22 wherein the plastisol laminating adhesive comprises polyvinyl chloride and antimony oxide.

* * * * *